United States Patent Office 2,694,218
Patented Nov. 16, 1954

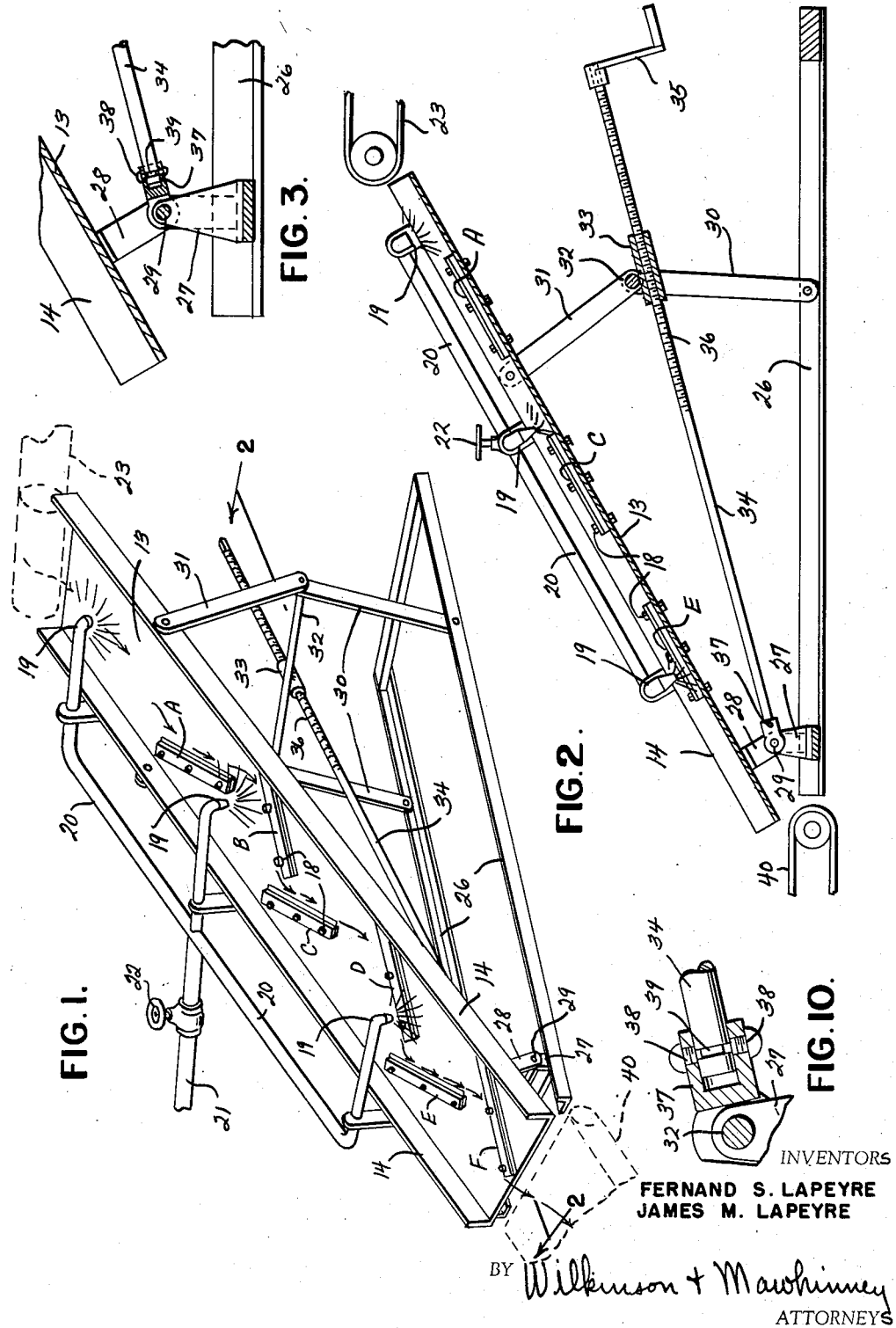

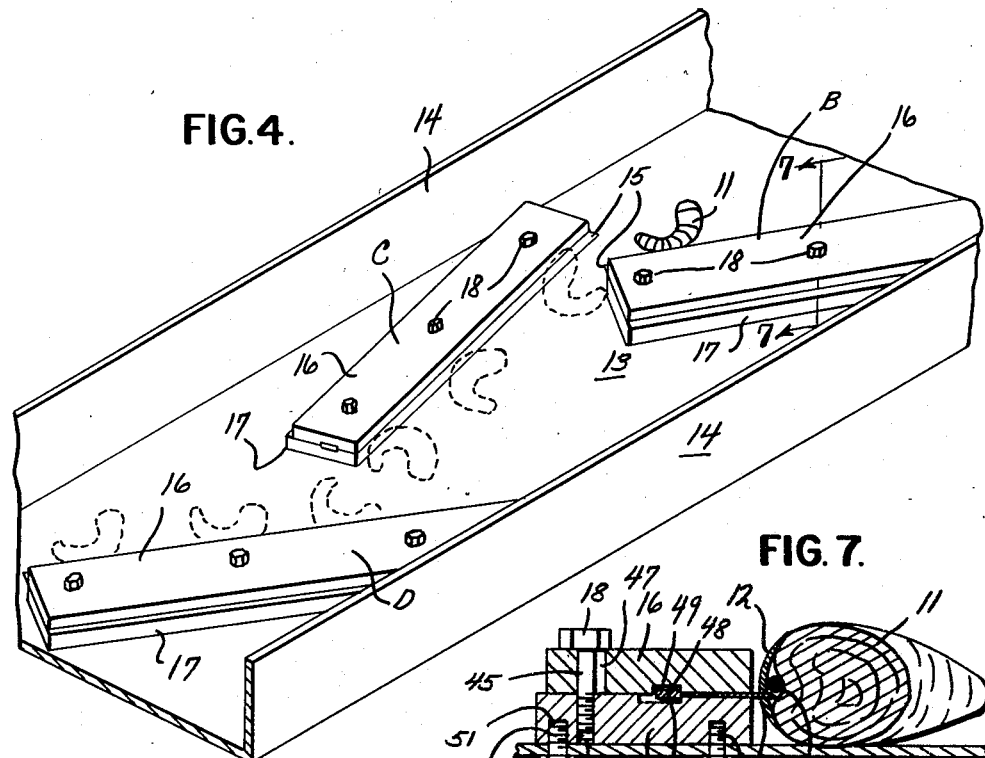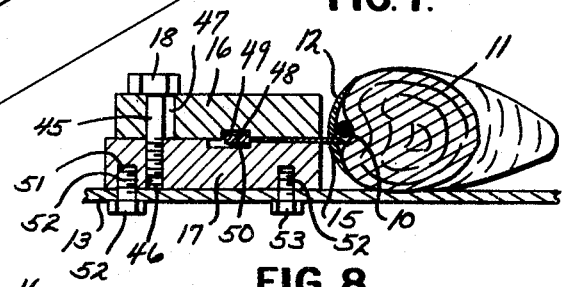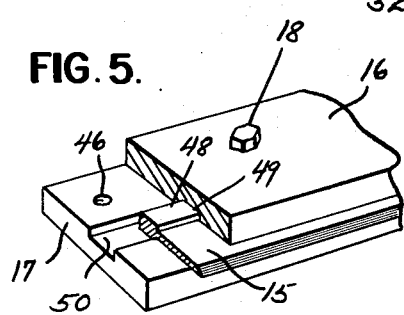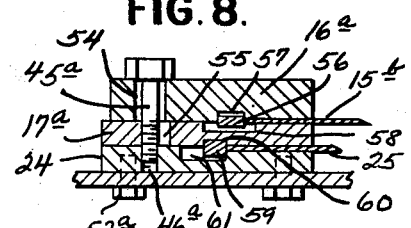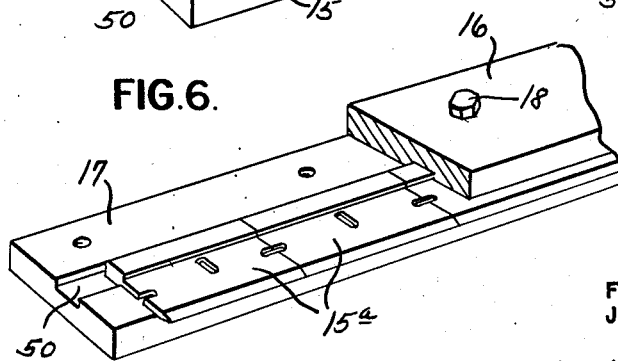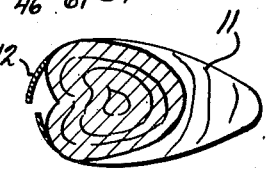

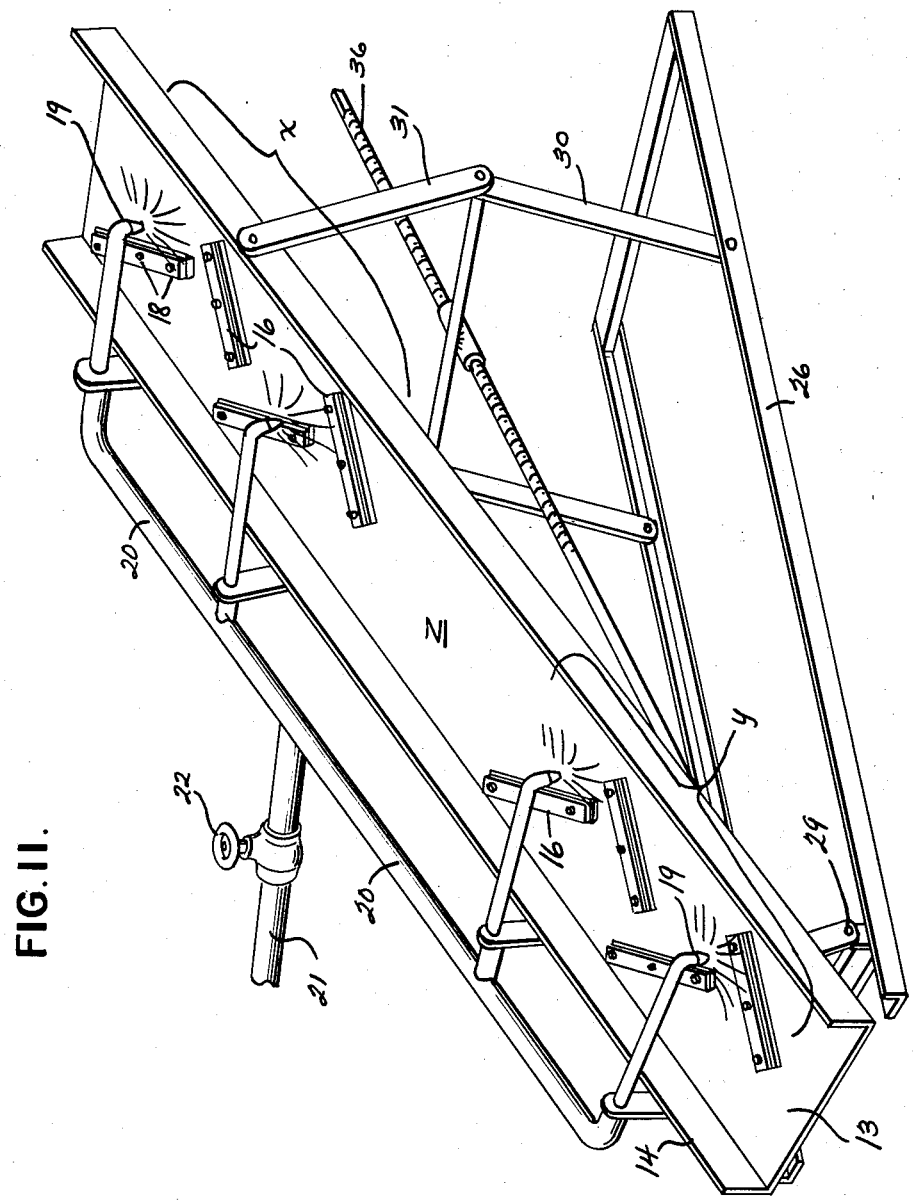

2,694,218
SHRIMP DEVEINING MACHINE

Fernand S. Lapeyre and James M. Lapeyre, New Orleans, La., assignors to The Peelers Company, Houma, La., a partnership Application August 19, 1952, Serial No. 305,184

15 Claims. (Cl. 17—2)

The present invention relates to improvements in shrimp de-veining machines and has for its object and purpose a machine for slitting the backs of shrimp in order to expose and release the black vein or alimentary canal along the back of the shrimp to permit its separation and removal from the shrimp meat for the purpose of improving the meat as an article of commerce.

Supplementary to the slitting operation which may be practiced alone, the invention also contemplates the use of fluid for washing the released vein or alimentary canal from the shrimp meat.

A further object of the invention is to provide an extremely simple form of machine for accomplishing both slitting and separating operations, the machine having an exceedingly high capacity for handling large numbers of the shrimp and effectively carrying out the above operations thereon.

The invention also contemplates the provision of one or more cutting blades in the knife assemblies with adjustments for the exposed depth of blade and with adjustments for the angle of the trough down which the shrimp are made to slide under the combined force of gravity and water current.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a perspective view of a form of shrimp de-veining machine constructed in accordance with the present invention, Figure 2 is a longitudinal vertical section taken on the line 2—2 in Figure 1.

Figure 3 is a fragmentary longitudinal section taken on an enlarged scale and being similar to Figure 2 of the lower portion of the trough and frame taken on an enlarged scale and showing details of the rotary rod socket.

Figure 4 is a fragmentary perspective view taken on a magnified scale through a portion of the trough with the shrimp shown in full and dotted lines as in positions against the knife blades, Figure 5 is a fragmentary perspective view of one form of knife blade assembly, Figure 6 is a similar view of a slightly modified form of knife blade assembly.

Figure 7 is a cross-section taken on an enlarged scale through one of the knife blade assemblies on the line 7—7 in Figure 4 with a peeled shrimp shown in contact with the projecting cutting edge of the knife blade, Figure 8 is a view similar to Figure 7 but showing a modification employing two blades of differential heights and exposed widths, Figure 9 is a cross-section taken through a de-veined shrimp after passage through the machine, Figure 10 is an enlarged section through the rotary rod socket, and Figure 11 is a perspective view of a modified form of machine.

Referring more particularly to the drawings and initially to Figure 7, the vein or alimentary canal 10 (sometimes referred to as the sand tract) of a shrimp 11 is located in a ridge along the back of the shrimp and is covered by a membrane 12 beneath the shell. In Figure 7 the shrimp 11 has already been peeled.

Heretofore, when this vein was removed, it was manually removed by cutting the back of the shrimp along its length and tearing out the vein. This was done after the hull or shell had been removed from the meat.

The present device is designed to cut the backs of the shrimp automatically and also to wash out the vein in an automatic manner.

The machine comprises generally an inclined trough down which the shrimp are adapted to slide. This trough consists of a base 13 and confining side walls 14. A series of knife blade assemblies are affixed to the base 13 of the trough. These blade assemblies may be in any suitable number and the trough may be of any appropriate length. In the single embodiment of the invention illustrated, six such blade assemblies are shown in Figure 1 and lettered A, B, C, D, E, and F.

These blade assemblies consist of knife blades 15 clamped between pairs of upper and lower clamp blocks 16 and 17 which may be clamped upon the blades 15 in any appropriate manner. In the form of the invention shown in the drawings such fastenings are in the form of screws having hexagonal or other heads 18. These screws 45 are threaded into threaded sockets 46 in the lower clamp blocks 17 and the shanks of the screw 45 extend through slots 47 in the upper clamp blocks 16. The slots 47 are elongated in a direction transversely of the blade assemblies. The heads 18 of the screws are wider than the longitudinal widths of the slots 47.

The blades 15 have enlarged heads 48 which are accommodated in recesses 49 in the upper clamp blocks 16 and in slots 50 in the lower clamp blocks 17. The slots 50 are wider in a transverse sense than the heads 48 so that the heads 48 may slide crosswise in the blade assemblies. However, the recesses 49 are only wide enough to receive the blade heads 48 so that when the upper clamp block 16 is adjusted laterally with respect to the lower clamp block 17 the blade 15 and its head 48 is entrained to move with the upper block 16, such head 48 sliding laterally in the slot 50. In this way the outer end of the blade 15 which is exposed beyond the inner end of the lower clamp block 17 may be adjusted. Tihs adjustment changes the degree of penetration or depth of cut of the blade 15 with respect to the shrimp 11.

The adjustment is made by first loosening the screws 45 of a particular blade assembly and then shifting the upper clamp block 16 and entrained blade head and blade 15, after which the screws 45 are again tightened to bind the two clamp blocks 16, 17 in the adjusted position.

As is shown in Figure 7, the blade assemblies are affixed to the trough bottom 13 by screws 52 which pass through apertures in the trough bottom 13 and enter threaded sockets 51 in the lower clamp blocks 17. The heads 53 of the screws take against the under surface of the trough base 13. Any other means of connecting the blade assemblies to the trough may be used.

The blade assemblies are arranged angularly or diagonally with respect to the long axis of the trough and the blades are relatively staggered from one side of the trough to the other. The upper ends of the blade assemblies are disposed closer to the side walls 14 and from this point the blade assemblies progress downwardly and toward the opposite side walls of the trough. The lower end portion of each inclined blade assembly is so related to the upper end of the next accembly in order that the shrimp will be delivered in succession from the lower end of one assembly to the upper end of the opposed successive assembly, it being understood that the exposed portions of the knife blades 15 are turned mutually toward one another. Thus, altogether the blade assemblies form an irregular or zig-zag path down the center of the trough which the shrimp are compelled to follow. This path is indicated by the arrows in Figure 1. In Figure 4 the peeled shrimp are shown in dotted lines as occupying various positions against the blades in the act of sliding down this trough.

Spray nozzles 19 in any appropriate number are placed above the trough in position to direct sprays of water down upon the trough base 13, against the shrimp and in some instances against the blades. The spray nozzles are connected to branch pipes 20 which stem out from a main water spray pipe 21 which may have a control valve 22 included therein.

The shrimp may be fed by hand one by one to the upper end of the trough or automatic apparatus such as the feed conveyor 23 may be employed for this purpose.

As shown in Figure 5 the blade 15 may be one long continuous blade co-extensive in length with the length of the blade assembly including the clamp blocks 16 and 17. Or as shown in Figure 6, the blade may be made up of a number of sections 15ᵃ such as razor blades.

In Figure 7 a single blade 15 or a single line of sectional blades 15ᵃ are shown at a preselected height from the floor of the trough base 13; while in Figure 8 two knives 15ᵇ and 25 are employed at different elevations, in this case there being three clamp blocks 16ᵃ, 17ᵃ and 24. The upper blade 15ᵇ may project to a greater distance from the clamp holder than the lower blade 25.

The uppermost clamp block 16ᵃ is provided with a laterally elongated slot 54, while a similar slot 55 is provided in the intermediate clamp block 17ᵃ. The shanks of the screws 45ᵃ extend loosely through these slots 54, 55 and the screws 45ᵃ are threaded into threaded sockets 46ᵃ in the lowermost clamp blocks 24.

The head 56 of blade 15ᵇ is snugly accommodated in a recess 57 of the top clamp block 16ᵃ while sliding freely in a laterally elongated slot 58 in the upper portion of the intermediate clamp block 17ᵃ. Similarly, the head 59 of blade 25 is snugly received in a recess 60 in the lower portion of the intermediate clamp block 17ᵃ. The head 59 slides freely in a lateral sense in the laterally elongated slot 61 made through the upper face of the lowermost clamp block 24. In this way the upper blade 15ᵇ is adjustable as to width of projection by lateral adjustment of the uppermost clamp block 16ᵃ while a similar adjustment is made with respect to blade 25 by the lateral adjustment of the intermediate block 17ᵃ. The slot 58 is wide enough for back and forth independent adjustment of both blocks 16ᵃ and 17ᵃ.

These lowermost clamp blocks 24 may be attached by screws 52ᵃ or otherwise to the bed 13 of the trough.

Referring more particularly to Figures 1, 2 and 3 an adjustable support is shown for the trough to vary the inclination thereof. In this instance brackets 27 and 28 on a bedframe 26 and on the trough respectively are connected together by pivots 29. Toggle links 30 and 31 are pivotally connected to rear portions of the bedframe 26 and trough. The toggle center is formed by a rod 32 to which the links 30 and 31 in pairs are pivoted at their proximate ends. The rod 32 carries centrally thereof a nut sleeve 33 internally threaded and meshing with a screw threaded portion 36 of a rotary rod 34 to which a crank handle 35 may be attached for manually rotating the same. The forward end of the rod 34 may be rotatably received in a socket 37 carried at the pivotal axis 29. The rod 34 may be held in the socket 37 as by one or more set screws 38, the inner ends of which interlock in an annular recess 39 of that forward end portion of the rod 34 included within the socket 37. This construction is shown to better advantage in Figure 10 in which the parts are magnified and in which the inner ends of the screws 38 are shown as reduced. The rod 34 freely rotates with respect to the socket 37 and screws 38.

A receiving conveyor 40 or the like may be placed conveniently to the lower discharge end of the trough for receiving the de-veined shrimp from the trough.

Referring more particularly to Figure 11, it is to be noted that there is an observed tendency of shrimp to fall back first as amply illustrated in Figure 4. Such tendency may be somewhat diminished by the shunting of the shrimp from blade assembly to blade assembly. It is, therefore, probably desirable to construct the machine with the complete assembly in stages X and Y as illustrated in Figure 11, with a clear drop space Z between the assemblies X and Y. In other words, after shrimp have encountered a number of blade assemblies 18, say four, in the zone X the trough would present a clear drop space Z. It is suggested that the distance between the zones X and Y might be eighteen or twenty inches. After the clear drop space Z a new series of blade assemblies are provided in the zone Y. As many zones and as many intermediate clear drop spaces as required may be used. The clear drop spaces Z so provided will allow the shrimp to regain their back-first dropping position and also allow them to gain more downward speed.

In the operation of the machine, the shrimp introduced at the top of the trough, and lubricated by water from the spray nozzles 19, slide down the trough base 13 and successively encounter the blade assemblies, being shunted from one blade assembly to the next in a zig-zag path as indicated by the arrows in Figure 1 or the dotted lines in Figure 4. As the shrimp encounters the blades, the membrane 12 along the back is severed by the blade. As only a portion of the membrane is usually severed by contact with any one blade, a multiplicity of blades is desirable in order to insure eventual severing of the membrane 12 along substantially the entire length of the shrimp.

The trough base 13 may be of metal, preferably polished, to provide a slick surface over which the shrimp, flatwise, will rapidly slide. It is observed that a shrimp tends to fall with its back downward, a fact which insures that the back of the shrimp will usually encounter the blades. However, even if the shrimp should fall with its back upwards slight mutilation results from contact with the blade inasmuch as the natural curve of the shrimp insures that only the head and tail tips encounter the blade.

It has been further found that, because of the width of the membrane 12 covering the vein (see Figures 7 and 9) the blades 15, 15ᵃ may be at a uniform height from the trough level and would insure cutting of the membrane both at the relatively thick head area and at the relatively thin tail area of the shrimp. So long as the membrane is severed along substantially the entire length of the shrimp the vein will be exposed even though the severance is not uniformly at the center of the shrimp's back.

Usually shrimp of substantially uniform size will be introduced into the machine so that prior to operation, blade assemblies of a suitable height from the trough and of a suitable depth of blade will be affixed to the trough. By depth of blade is meant the distance which the blade projects from its lower clamp block. This depth controls the degree of penetration of the blade. However, in the event that shrimp of various sizes are to be introduced into the machine, two-bladed assemblies (Figure 8) may be employed with one blade of a greater height and depth than the other. The large shrimp contact blade 15ᵇ, namely the upper blade of Figure 8 while small shrimp contact the lower blade 25.

Water, sprayed against the blade assemblies by the spray nozzles 19, deflects or cascades therefrom to wash open the cut membranes and to wash out the veins or alimentary canals from the shrimp meats. The water also superimposes a fluid boundary surface which tends to make the surface of the trough slick and to promote the movement of the shrimp down the inclined trough in aid of the force of gravity.

Experimentation discloses that in order for the device to be most effective the shrimp should be introduced into the trough one at a time, although only a split second need intervene between introduction of successive shrimp. The shrimp descend the trough very rapidly, so that the device will still have a large hourly capacity despite the necessity of introduction of each shrimp individually.

The correct depth of cut is determined by the degree of protrusion of the cutting blade beyond the blade holder.

Measurement of the shrimp will show the correct height to set the blade above the trough. Blocks 17 of different thickness may be used to control this elevation of height. The knife is, therefore, in position to cut the membrane below its center at the head or thick end of the shrimp and about its center or slightly above its center at the tail or thin end of the shrimp. The angle of the blades to the sides of the trough may be set so as to insure maximum cutting action by allowing the shrimp to slide along the cutting edge of one blade and by deflecting the shrimp's downward progress to contact succeeding blades. This angle will also depend upon the angle of inclination of the trough.

The angle of trough inclination will be such as to insure rapid and forceful movement of the shrimp down the trough and from blade to blade. The inclination should be as steep as possible, but not so steep as to cause the shrimp to lose contact with the bottom of the trough. By rotating the crank handle 35 and the screw rod 34, the sleeve 33 may be advanced forwardly or retracted rearwardly to either raise or lower the rear end of the trough about its forward fulcrum 29 this action taking place through the toggle levers 30, 31. As the sleeve 33 advances forwardly the rear end of the trough will be raised, and as the sleeve 33 moves backwardly the rear end of the trough will be lowered. The action of the machine may be begun by feeding shrimp to the trough and the handle 35 may be experimentally rotated to gradually raise the rear end of the trough until it reaches a point where the shrimp begin to lose contact with the bottom of the trough. The handle 35 may then be reversed in rotation slowly and through a small angle to reach the ideal point where the shrimp do not lose such contact with the trough bottom.

The valve 22 may also be experimentally opened to gradually increase the force of the water spray 19 to arrive at an ideal water spray under ideal pressure to lubricate the trough for easy sliding of the shrimp and to provide water cascades at the blade edges for washing open the severed membranes and flushing out the vein or alimentary canal.

In a successful experimental device a blade assembly is composed of a series of twelve conventional single edge razor blades arranged end to end as indicated at 15ª in Figure 6. Such razor blades appear to be ideally suited to the purpose.

The shrimp meat and the severed and separated veins are collected together at the bottom of the trough and are later separated one from another in a further operation.

Although we have disclosed herein the best form of the invention known to us at this time, we reserve the right to all such modifications and changes as may come within the scope of the following claims.

What we claim is:

1. A shrimp de-veining machine comprising an inclined trough, a water supply to said trough, and knives carried by said trough and being spaced above the trough and being oppositely inclined along a path down the trough, said knives extending partially diagonally of the path in successively opposite directions.

2. A shrimp de-veining machine comprising a trough having upper and lower ends and being pivoted near its lower end, an adjustable jack near its upper end to vary the inclination of the trough, and knives diagonally disposed above the trough in the path of shrimp sliding down the same.

3. A shrimp de-veining machine comprising an inclined trough down which the shrimp are induced to slide, a knife in said trough positioned to be encountered by the shrimp to cut the membrane confining the vein, and a water spray to the trough directed upon the shrimp for sliding shrimp down the trough and for flushing out the vein through the severed membrane.

4. A shrimp de-veining machine comprising an inclined trough down which the shrimp are adapted to slide back-first, a plurality of cutting blades diagonally disposed of said trough opposite to one another in said trough each having at least one blade positioned to be encountered by the back of the shrimp which severs the back membrane, said blades being spaced apart to provide a clear drop space for affording the shrimp opportunity to regain the back-first drop position prior to entering the next successive blade.

5. A shrimp de-veining machine as claimed in claim 4 further comprising means for supplying water to the trough to cascade past the cutting blades to flush out the vein of the shrimp through the severed membranes.

6. A shrimp deveining machine comprising an inclined trough-like means having a surface over which shrimp are adapted to move, a plurality of diagonally set knives having edges directed upwardly of said trough, said knives extending at least partially across said trough in successively opposite directions and force directing means operatively associated with said trough whereby said shrimp are slid down said trough-like means to be engaged by said knives.

7. A shrimp deveining machine as claimed in claim 6 wherein said diagonally set knives are disposed with their blades raised above said inclined trough-like surface positioned to contact the alimentary canal of the shrimp being slid down said trough.

8. A shrimp deveining machine comprising an inclined trough-like means having a surface over which shrimp are adapted to move, a plurality of diagonally set knives having edges directed upwardly of said trough, said knives extending at least partially across said trough in successively opposite directions and lubricating directing means operatively associated with said trough whereby said shrimp are slid down said trough-like means to be engaged by said knives.

9. A shrimp de-veining machine comprising a member having an inclined surface down which the shrimp slide, and knives diagonally positioned above said surface to be engaged by the shrimp.

10. A shrimp de-veining machine comprising a member having an inclined surface down which the shrimp slide, membrane incising means diagonally positioned above said surface to be engaged by the shrimp whereby said incising means splits the membrane of the backs of the shrimp to expose and release the alimentary canal along the back of the shrimp.

11. A shrimp de-veining machine comprising a member having an inclined surface down which the shrimp slide, knives diagonally positioned above the surface to be engaged by the shrimp, and means for mounting said knives parallel to and spaced from said surface.

12. A shrimp de-veining machine comprising a member having an inclined surface down which the shrimp are adapted to slide, and cutting means diagonally positioned with their cutting edges above said surface and disposed at least partially across said surface and being positioned to be hit by the shrimp on their descent down said inclined surface for splitting the backs of the shrimp to expose the alimentary canal along the backs of the shrimp.

13. A shrimp de-veining machine comprising a member having an inclined surface defining a path down which the shrimp slide, knife means diagonally positioned above said surface and being disposed in a partially overlapping spaced zig-zag pattern along the path of the shrimp whereby said shrimp upon their descent down said path strike the cutting edges of said knife means splitting the back membrane of the shrimp.

14. A shrimp de-veining machine comprising a slide member having a surface over which shrimp slide, knife means diagonally disposed above the surface of said member and being positioned to be struck by the shrimp in their movement over said surface to split the back membrane of the shrimp.

15. A shrimp de-veining machine as claimed in claim 11 further comprising controlled water sprays above said knives whereby a fluid boundry surface is superimposed upon the inclined surface to facilitate the movement of the shrimp thereover.

References Cited in the file of this patent

UNITED STATES PATENTS

| Number | Name | Date |
|---|---|---|
| 2,102,945 | Doxsee, Jr., et al. | Dec. 21, 1937 |
| 2,528,402 | Watson | Oct. 31, 1950 |

FOREIGN PATENTS

| Number | Country | Date |
|---|---|---|
| 566,622 | Germany | Dec. 21, 1932 |